Patented June 8, 1954

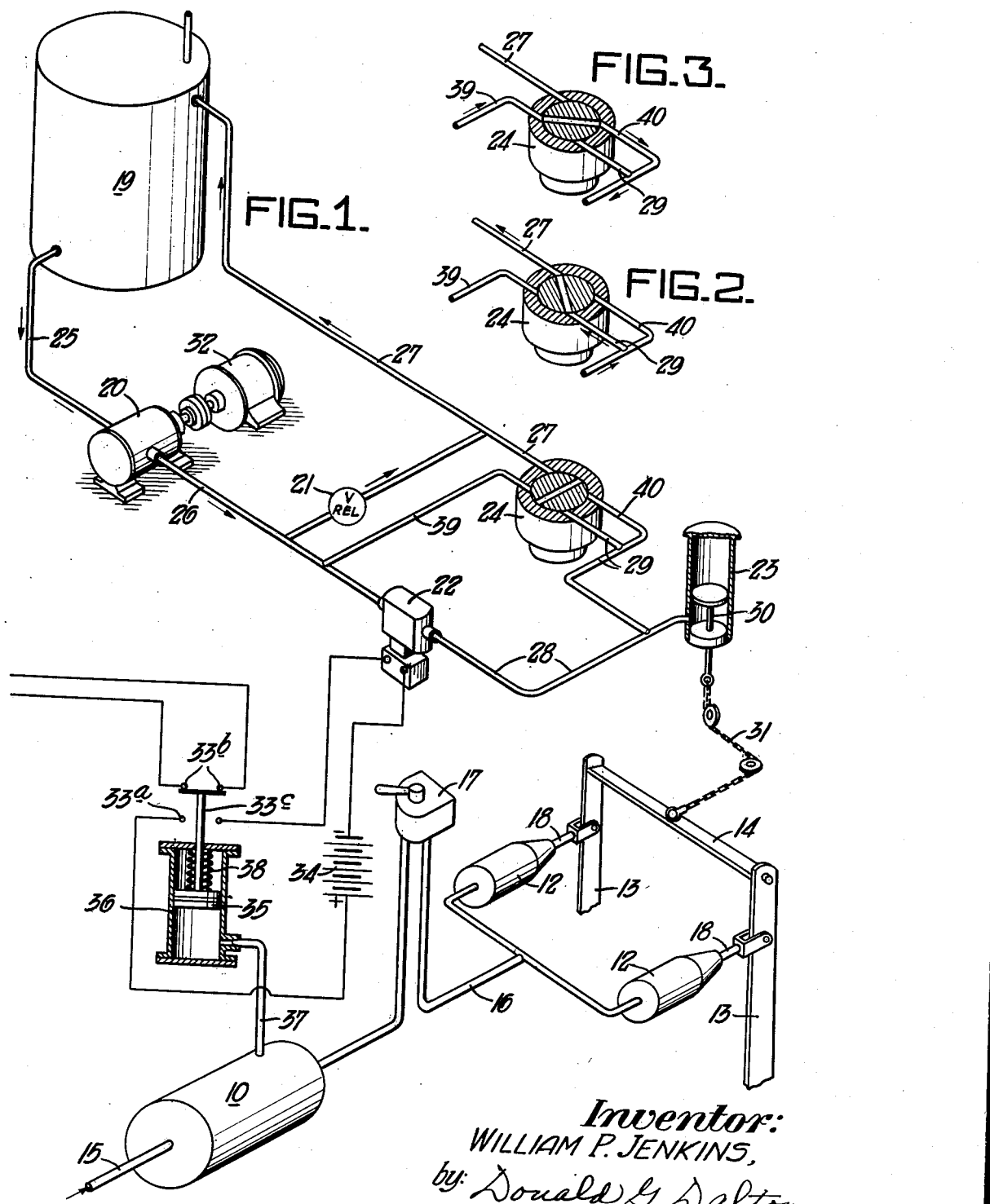

2,680,500

UNITED STATES PATENT OFFICE 2,680,500

BRAKING SYSTEM

William P. Jenkins, Clairton, Pa., assignor to United States Steel Corporation, a corporation of New Jersey Application November 26, 1952, Serial No. 322,709

8 Claims. (Cl. 188—153)

This invention relates to an automatic auxiliary braking system for vehicles.

Commonly larger vehicles, such as diesel-electric locomotives, have air brakes for all normal and emergency braking operations and a manually operated parking brake. However, I have observed that many such vehicles lack adequate provision for applying the brakes on failure of the air supply.

An object of the present invention is to provide an auxiliary hydraulic braking system for vehicles which have air braking systems subject to failure on loss of their air supply.

A more specific object is to provide an auxiliary hydraulic braking system for use in conjunction with an air braking system in which the hydraulic system acts automatically to apply the brakes whenever the air supply fails and optionally can be used to apply the brakes manually.

In accomplishing these and other objects of the invention, I have provided improved details of structure, a preferred form of which is shown in the accompanying drawing, in which:

Figure 1 is a schematic view of an air braking system and an auxiliary hydraulic braking system constructed in accordance with the present invention;

Figure 2 is a schematic view of a four-way control valve embodied in the hydraulic system illustrating its position for releasing the brakes; and Figure 3 is a schematic view of this same valve illustrating its position for manually applying the brakes through the hydraulic system.

Figure 1 shows schematically an air braking system of a known type used on vehicles such as diesel-electric locomotives. The system includes an air storage tank 10, a pair of brake cylinders 12, a pair of brake levers 13, and a brake beam 14. Tank 10 receives its air supply via a pipe 15, which leads to a compressor, not shown. A pipe 16 extends from tank 10 to both cylinders 12 and contains a manually operated control valve 17. The cylinders contain pistons and piston rods 18 which are mechanically connected to the brake levers. As long as the system is in proper working order, the brakes can be set or released by operating the valve 17.

The present invention provides an auxiliary hydraulic braking system which can be used with air braking systems of this or similar types for setting the brakes automatically on failure of the air supply. The auxiliary system comprises a hydraulic storage tank 19, a pump 20, a pressure relief valve 21, a solenoid operated valve 22, a hydraulic brake cylinder 23, and a four-way manually operated valve 24. A pipe 25 connects tank 19 with the inlet of pump 20, and a pipe 26 connects the pump discharge with both the pressure relief valve 21 and the solenoid operated valve 22. A return pipe 27 leads from said pressure relief valve back to the tank 19. A pipe 28 extends from the solenoid operated valve 22 to the inlet of cylinder 23. A pipe 29 connects this cylinder with the four-way valve 24, which in turn has a connection with the return pipe 27. Cylinder 23 contains a reciprocable piston and piston rod 30, which has a mechanical connection 31 with the brake beam 14. A motor 32 drives the pump 20 continuously and is itself powered from the main generator of the vehicle, not shown.

Normally the solenoid operated valve 22 is closed. Consequently the pressure which the pump 20 generates acts on the pressure relief valve 21 to establish communication between pipes 26 and 27. The pump merely circulates fluid idly from tank 19, through pipes 25 and 26, valve 21 and pipe 27, back to the tank. No hydraulic pressure reaches cylinder 23, and consequently the brakes are not set. The four-way valve 24 occupies a neutral position, as indicated in Figure 1.

The operating solenoid of valve 22 is electrically connected in series with a set of normally open contacts 33a of a double throw switch. This circuit can be energized from any suitable source such as a battery 34. The second set of contacts 33b of the switch are normally closed and are connected in the traction control circuit. The switch has a contactor 33c which is attached to a piston 35 mounted for reciprocable movement in a cylinder 36. A pipe 37 connects the cylinder to the air storage tank 10. A spring 38 is mounted in the cylinder 36 and acts on the piston 35 in the opposite direction from the air pressure in the tank.

As long as the air pressure in tank 10 is properly maintained, the piston 35 and contactor 33c remain in their normal position (i. e., contacts 33a open and contacts 33b closed). Thus the traction control circuit is closed and the main drive can move the vehicle. The circuit to the solenoid valve 22 is open, and this valve remains in its normally closed position in which it prevents hydraulic fluid from reaching the hydraulic brake cylinder 23. When the air supply fails, the spring 38 moves the piston 35 and contactor 33c to open the contacts 33b and close the contacts 33a. Opening the contacts 33b interrupts the traction control circuit and stops the drive means of the vehicle. Closing the contacts 33a completes the circuit to the solenoid of the valve 22 and opens this valve. With valve 22 open, the pump 20 delivers hydraulic fluid from the tank 19 via pipes 25, 26 and 28 to the cylinder 23 and thus sets the brakes. After the air pressure in the tank 10 is restored, the contactor 33c returns to its normal position, but the brakes remain set until the operator turns the four-way valve 24 to establish communication between the pipes 29 and 27, as shown in Figure 2. Thereupon fluid drains from the cylinder 23 back to the tank 19. The auxiliary system is then reset by returning the four-way valve 24 to its neutral position. The auxiliary system also includes connections that enable it to be operated manually to set the brakes. These connections afford a means for braking the vehicle in the event both the solenoid circuit and the air supply fail at the same time. For this purpose a pipe 39 is connected into the pipe 26 and extends to the four-way valve 24. A pipe 40 is connected between the four-way valve and the pipe 29. When the four-way valve is operated to establish communication between pipes 39 and 40, the pump 20 delivers hydraulic fluid from tank 10 via pipes 25, 26, 39, 40 and 29 to the cylinder 23, by-passing the solenoid operated valve 22. Thus the hydraulic cylinder acts to set brakes in the same way as before.

From the foregoing description it is seen that the present invention affords a simple mechanism for automatically setting vehicle brakes in the event of an air supply failure. No reliance is made on mere auxiliary or emergency air cylinders, since it is possible for such cylinders also to lose their air supply. Instead the system uses a completely independent hydraulic circuit which is always available.

While I have shown and described only a single embodiment of the invention, it is apparent that modifications may arise. Therefore I do not wish to be limited to the disclosure set forth but only by the scope of the appended claims.

I claim:

1. In a vehicle having an air braking system which includes air storage means, at least one brake cylinder, at least one brake lever, means connecting said storage means with said cylinder, and means connecting said cylinder with said lever, the combination with said air braking system of an auxiliary hydraulic braking system comprising a hydraulic storage tank, a pump having an inlet and a discharge, piping connecting said tank with said pump inlet, a relief valve, a normally closed valve, piping connecting said pump discharge with both of said valves, piping connecting said relief valve with said tank, whereby said pump can circulate fluid idly through said relief valve, a hydraulic braking cylinder, piping connecting said normally closed valve with said hydraulic cylinder, means connecting said hydraulic cylinder with said lever, and pressure responsive means connecting said normally closed valve with said air storage means for opening the latter valve on failure of the air supply and thus admitting hydraulic fluid from said pump to said hydraulic cylinder.

2. A combination as defined in claim 1 in which said normally closed valve has an operating solenoid, and said pressure responsive means includes an electric circuit connected to said solenoid, a switch in said circuit, and means controlled by pressure in said air storage means for operating said switch.

3. A combination as defined in claim 1 in which said hydraulic braking system also includes return piping connecting said hydraulic cylinder with said tank, and a normally closed valve in said return piping for resetting the hydraulic system.

4. A combination as defined in claim 1 in which said hydraulic braking system also includes return piping connecting said hydraulic cylinder with said tank, piping connecting said pump discharge with said hydraulic cylinder by-passing said normally closed valve, and a four-way valve connected in the piping between the hydraulic cylinder and tank and the piping between the pump discharge and hydraulic cylinder, said four-way valve having a neutral normally closed position, a position for resetting the hydraulic system, and a position for manually operating the hydraulic system.

5. In a vehicle having an operating circuit and an air braking system which includes air storage means, at least one brake cylinder, at least one brake lever, means connecting said storage means with said cylinder, and means connecting said cylinder with said lever, the combination with said air braking system of an auxiliary hydraulic braking system comprising a hydraulic storage tank, a pump having an inlet and a discharge, piping connecting said tank with said pump inlet, a relief valve, a normally closed solenoid operated valve, piping connecting said pump discharge valve, piping connecting said pump discharge with both of said valves, piping connecting said relief valve with said tank, means for continuously driving said pump and thus circulating fluid idly through said relief valve, a hydraulic braking cylinder, piping connecting said solenoid operated valve with said hydraulic cylinder, means connecting said hydraulic cylinder with said lever, an electric circuit connected to the solenoid of said solenoid operated valve and having a set of normally open contacts in series therewith, a contactor, and means controlled by pressure in said air storage means for operating said contactor and completing the circuit to the solenoid on loss of air pressure, the solenoid when energized opening said solenoid operated valve for admitting hydraulic fluid from said pump to said hydraulic cylinder.

6. A combination as defined in claim 5 which includes a set of normally closed contacts in the operating circuit for the vehicle and in which said contactor is adapted to open said last named contacts on loss of air pressure.

7. A combination as defined in claim 5 in which said hydraulic braking system also includes return piping connecting said hydraulic cylinder with said tank, and a normally closed valve in said return piping for resetting the hydraulic system.

8. A combination as defined in claim 5 in which said hydraulic braking system also includes return piping connecting said hydraulic cylinder with said tank, piping connecting said pump discharge with said hydraulic cylinder by-passing said solenoid operated valve, and a four-way valve connected in the piping between the hydraulic cylinder and tank and the piping between the pump discharge and hydraulic cylinder, said four-way valve having a neutral normally closed position, a position for resetting the hydraulic system, and a position for manually operating the hydraulic system.

References Cited in the file of this patent

UNITED STATES PATENTS

| Number | Name | Date |
| --- | --- | --- |
| 2,088,486 | Schoepf et al. | July 27, 1937 |
| 2,192,021 | Weeks | Feb. 27, 1940 |
| 2,409,740 | Dilworth et al. | Oct. 22, 1946 |
| 2,502,152 | Hudson | Mar. 28, 1950 |
| 2,531,055 | Kirk | Nov. 21, 1950 |